United States Patent [19]

Kaga

[11] Patent Number: 5,305,655
[45] Date of Patent: Apr. 26, 1994

[54] STEERING WHEEL WITH AN AIR BAG UNIT AND METHOD OF MANUFACTURES

[75] Inventor: Kouichi Kaga, Inazawa, Japan

[73] Assignee: Toyoda Gosei Co., Ltd., Nishikasugai, Japan

[21] Appl. No.: 61,501

[22] Filed: May 14, 1993

Related U.S. Application Data

[63] Continuation of Ser. No. 783,157, Oct. 28, 1991, abandoned.

[30] Foreign Application Priority Data

Oct. 29, 1990 [JP] Japan .................................. 2-291505

[51] Int. Cl.⁵ .......................... B62D 1/04; B60R 21/16
[52] U.S. Cl. ........................................ 74/552; 29/834.1; 280/750; 280/731
[58] Field of Search .................. 74/552, 558; 280/777, 280/778, 750, 727, 731, 779, 43.17; 29/434, 894.1

[56] References Cited

U.S. PATENT DOCUMENTS

| | | | |
|---|---|---|---|
| 4,047,450 | 9/1977 | Lecart et al. | 74/552 |
| 4,089,542 | 5/1978 | Westerman | 280/43.17 |
| 4,584,900 | 4/1986 | Masuda | 74/552 |
| 4,753,129 | 6/1988 | Ishida et al. | 74/552 |
| 4,787,132 | 11/1988 | Kilgore | 29/434 |
| 4,884,823 | 12/1989 | Honda | 280/731 |
| 4,899,613 | 2/1990 | Kawaguchi | 280/731 |
| 4,976,801 | 12/1990 | Martine et al. | 74/552 X |
| 5,085,466 | 2/1992 | Nakatsuka et al. | 280/731 X |
| 5,090,731 | 2/1992 | Fujita et al. | 280/777 |
| 5,134,899 | 8/1992 | Nagata et al. | 74/552 |
| 5,142,936 | 9/1992 | McGale | 74/573 F |

FOREIGN PATENT DOCUMENTS 3827794  3/1989  Fed. Rep. of Germany ........ 74/552
62-234781 10/1987  Japan .

Primary Examiner—Vinh T. Luong
Attorney, Agent, or Firm—Cushman, Darby & Cushman

[57] ABSTRACT

A steering wheel with an air bag unit having a center located behind the boss of the steering wheel. A weight member is buried within a front portion of the steering wheel core for reducing displacement of the center of gravity of the steering wheel caused by the air bag unit.

3 Claims, 3 Drawing Sheets

STEERING WHEEL WITH AN AIR BAG UNIT AND METHOD OF MANUFACTURES

This is a continuation of Application No. 07/783,157, filed on Oct. 28, 1991, which was abandoned upon the filing hereof.

BACKGROUND OF THE INVENTION

1. Field of the Invention

The present invention relates to a steering wheel provided with an air bag unit.

2. Description of the Related

Among known steering wheels, there is one having an air bag unit, the center of which is located behind the boss of the steering wheel so that visibility is improved and the field of vision is secured (Japanese Patent Unexamined Publication No. 62 (1987)-234781).

However, this type of steering wheel has a problem in that when the steering wheel is turned about 180° from the steering neutral position, steering is liable to become unstable since the air bag unit is relatively heavy, for example, about 4 kg.

SUMMARY OF THE INVENTION

Accordingly, it is an object of the present invention to provide a steering wheel with an air bag unit, which is capable of overcoming the instability in steering possessed by other steering wheels with air bags.

In view of this and other objects, the present invention provides a steering wheel with an air bag unit, the center of which is positioned behind a boss of the steering wheel.

The steering wheel with an air bag according to the present invention includes a steering wheel core having a front portion with means for weighting the core buried therein. The weighting means reduces displacement of the center of gravity of the steering wheel caused by the air bag unit.

According to the present invention, the weighting means which is buried within the front portion of the steering wheel core reduces displacement of the center of gravity of the steering wheel caused by the air bag unit. Thus, when the steering wheel is rotated 180° from the steering neutral position, steering of the steering wheel is more stable than prior art steering wheels.

BRIEF DESCRIPTION OF THE DRAWINGS

Other objects, features and characteristics of the present invention, as well as the methods of operation and the functions of the related elements of the structure, will become apparent upon consideration of the following description and the appended claims with reference to the accompanying drawings, all of which form a part of this specification, and wherein like reference numerals designate corresponding parts in the various figures. In the drawings:

DETAILED DESCRIPTION OF THE PRESENTLY PREFERRED EXEMPLARY EMBODIMENTS

Figure 1:
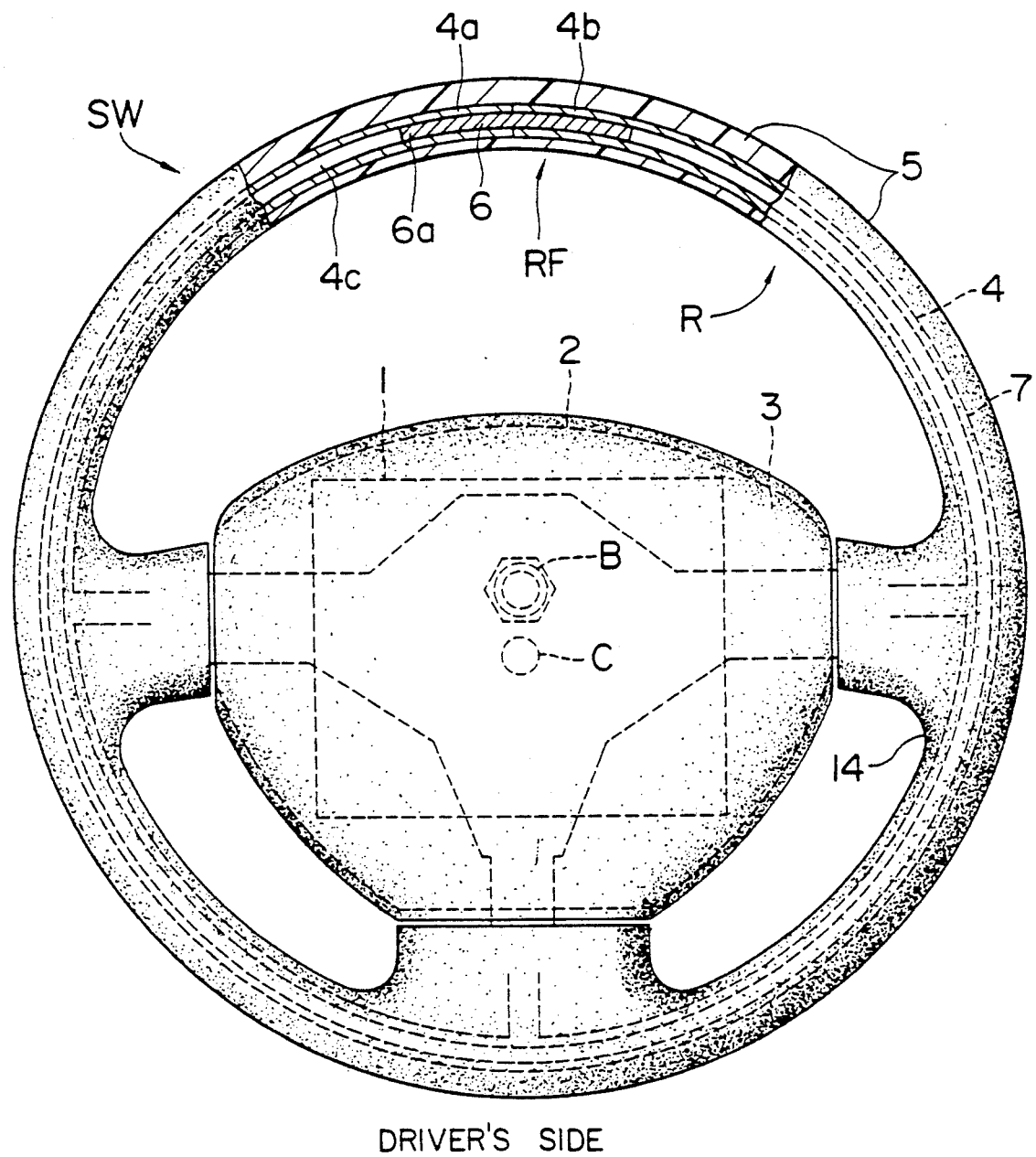
FIG. 1 is a plan view, partly cut away, of a steering wheel with an air bag unit according to the present invention.
Figure 2:
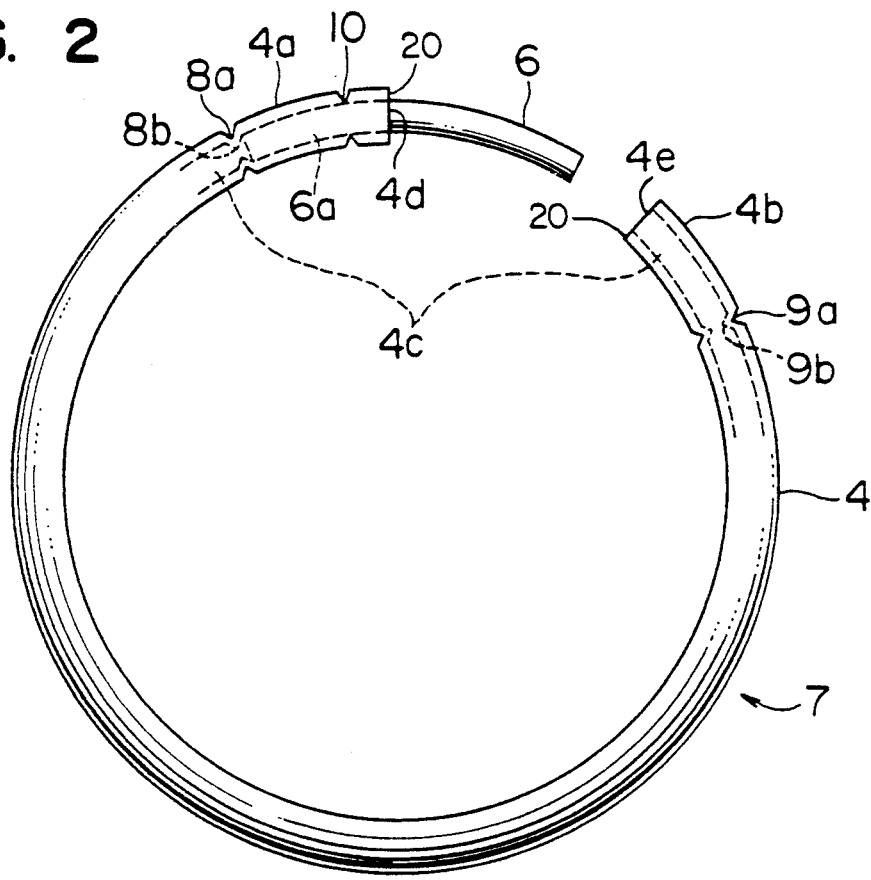
FIGS. 2 and 3 illustrate fabrication steps of the steering wheel core of the steering wheel of FIG. 1.
Figure 3:
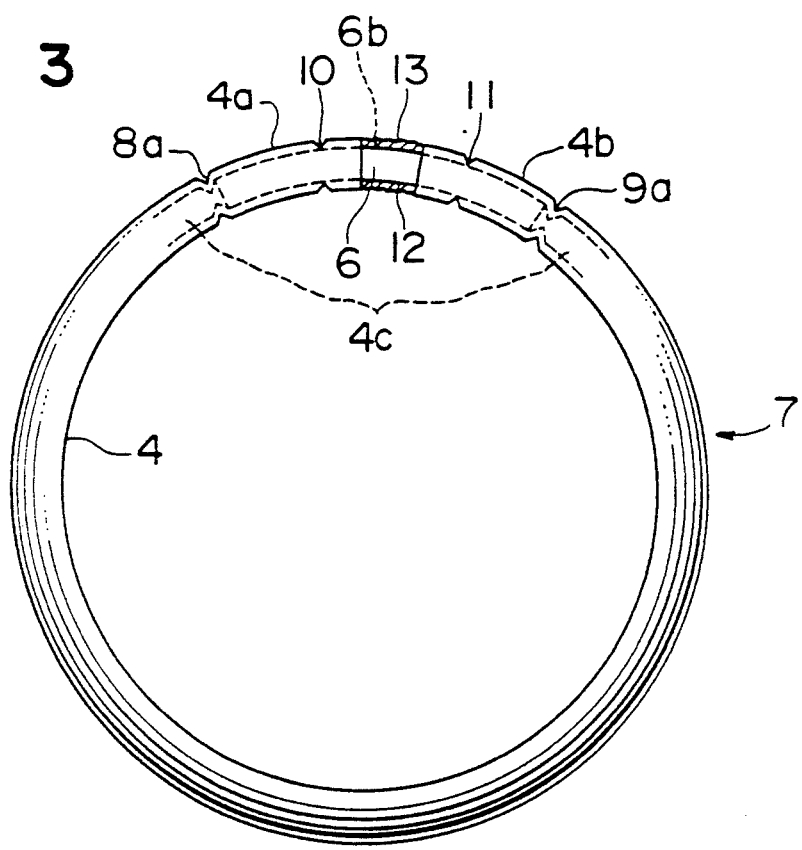

In FIGS. 1 to 3, a steering wheel SW with an air bag unit 1 will be described. In the steering wheel SW, the air bag unit 1 is, as shown in FIG. 1, disposed within a space defined by a lower cover 2 and a pad 3 in a conventional fashion. The central portion C of the air bag unit 1 is located behind the boss B of the steering wheel SW.

the steering wheel SW is provided with a ring portion R, which includes a steering wheel core 7 and a ring core coating layer 5 coating the core 7. The ring core coating layer 5 is made of a polyurethane resin or a similar synthetic resin.

Because of the weight and position of the center of gravity of the air bag unit 1, a predetermined length and weight of elongated weight rod 6 is buried in a hollow ring core 4 of the steering wheel core 7 at a front portion RF of the ring portion R. The steering wheel SW is installed so that in the steering neutral position (as shown in FIG. 1), the front portion RF is the closest section of the steering wheel SW to the windshield of the car and is the most remote section of the steering wheel SW from the driver.

To fabricate the steering wheel core 7 having a weight rod 6 positioned at a front portion thereof, an outer circumferential recess 8a is, as shown in FIGS. 2 and 3, formed by caulking or a similar operation in the ring core 4 at a predetermined distance from the end 4d of the one end portion 4a of the ring core 4, and thereby an inwardly projecting circumferential bead 8b is formed. In this manner, a portion having a smaller inner diameter than the rest of the ring core 4 is formed. The other end portion 4b of the ring core 4 is also previously provided at a predetermined distance from the end 4e of the other end portion 4b with an outer circumferential recess 9a by caulking or a like operation, and thus an inwardly projecting circumferential bead 9b is formed. Then, a substantially arcuate weight rod 6 is inserted into the hollow portion 4c of the ring core 4 until one end of the weight rod 6 comes into abutment against the inwardly projection circumferential bead 8b, and is thus stopped. Then, to prevent the weight rod 6 from moving from the one end portion 4a, a circumferential recess 10 is formed by caulking or a like operation in the end portion 4a of the ring core 4 at a position nearer to the end 4d of the ring core 4 than the circumferential recess 8a. Subsequently, the other end portion 4b of the ring core 4 is fitted around the exposed portion 6a of the weight rod 6 until a second end of the weight rod is brought into abutment with the inwardly projecting circumferential bead 9b as shown in FIG. 3. In this vent, a gap 20 is formed between the opposite ends 4d and 4e of the ring core 4. To prevent the weight rod 6 from coming off from the end portion 4b of the ring core 4, a circumferential recess 11 is formed by caulking or a like operation in the end portion 4b of the ring core 4 at a position nearer to the other end 4e of the ring core 4 than the circumferential recess 9a. Thus, a circumferential groove 12 is defined by the opposite ends 4d and 4e of the ring core 4 and an exposed circumferential surface 6b of the weight rod 6.

Then, once ends 4d and 4e of ring core 4 have been closed, leaving an exposed circumferential surface 4b of weight rod 6, welding is performed so as to fill in the circumferential groove 12 with a welding material 13.

In this manner, the steering wheel core 7 having the weight rod 6 buried in the front portion RF thereof is fabricated.

In this embodiment, the weight rod 6 buried in the front portion RF of the ring core 4 serves to cancel or reduce displacement of the center of gravity of the steering wheel SW due to the air bag unit 1, which has a center of gravity located behind the boss B. Thus, steering is stable when the steering wheel SW is turned about 180° from the steering neutral position shown in FIG. 1.

In the embodiment previously described, the circumferential groove 12 which is defined by the opposite ends 4d and 4e of the ring core 4 and 1 the weight rod 6 is filled up with the welding material 13 so that the circumferential surface of the welding material 13 filled in the groove 12 is substantially flush with the outer circumferential surfaces of the opposite end portions 4a and 4b of the ring core 4. Thus, when a coating layer 14 (FIG. 1) is formed over the steering wheel core 7 by injection molding, the front portion RF of the ring core 4 does not prevent or disturb an even flow and distribution of the coating material that forms layer 14.

Figure 4:
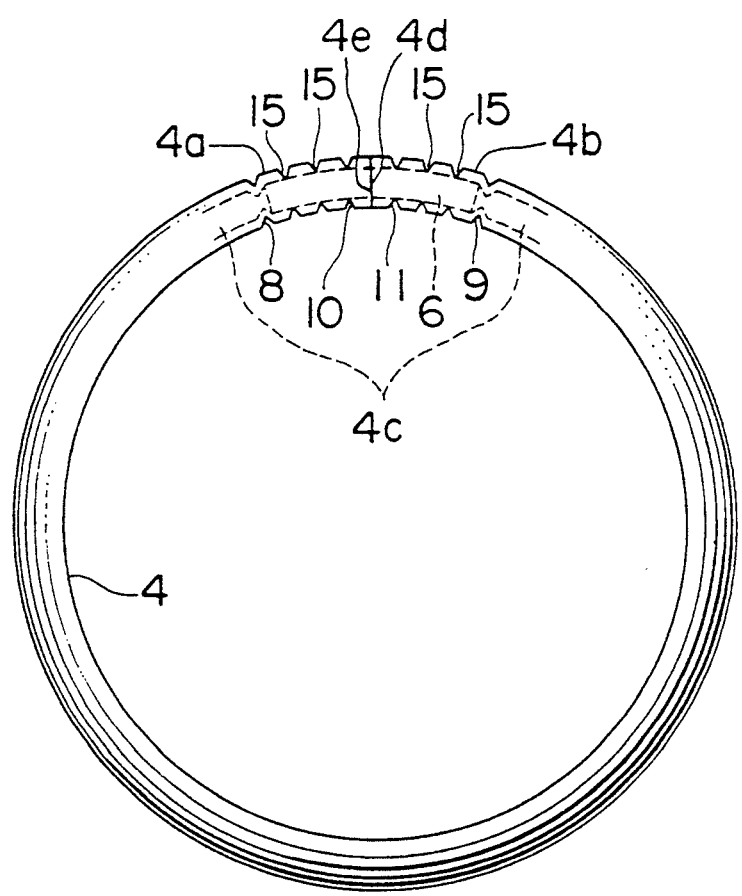
FIG. 4 is a plan view of a steering wheel core according to a second embodiment of the present invention.

Although in the embodiment, the gap defined between the opposite ends 4d and 4e of the ring core 4 is filled with the welding material 13, as shown in FIG. 4, the opposite ends 4d and 4e of the ring core 4 may be closed so as to contact one another. In this case, the end portions 4a and 4b are fit around the weight rod 6 so as to contact one another. Then, the end portions 4a and 4b are positively joined to the weigh rod 6 by forming several recesses 15 in them by caulking or a like processing, and thereby the end portions 4a and 4b are firmly joined to each other through the weight rod 6.

While the invention has been described in connection with what is presently considered to be the most practical and preferred embodiments, it is to be understood that the invention is not to be limited to the disclosed embodiments, but rather is intended to cover various modifications and equivalent arrangements included within the spirit and scope of the appended claims.

What is claimed is:

1. A steering wheel for a vehicle, comprising:
   an air bag unit therein, said air bag unit being disposed within the steering wheel so that a center of said unit is positioned on a driver side of a boss of said steering wheel, said steering wheel having a center of gravity subject to displacement by said air bag unit;
   a steering wheel core having a hollow ring core including a front portion; and
   means for weighting the steering wheel to minimize said displacement of the center of gravity of the steering wheel;
   wherein said weighting means is buried within said core; and
   wherein said steering wheel includes a right spoke member and a left spoke member; and
   wherein said weighting means is disposed halfway between said left and right spoke members in said hollow ring core of said steering wheel
   wherein said steering wheel core includes:
   a hollow ring core having opposite end portions that fit around said weight member; and
   means for joining the opposite end portions to the weight member;
   wherein the opposite end portions are joined to the weight member so as to produce a gap between opposite ends of the ring core and so that a circumferential groove is defined by the opposite ends and a circumferential surface of the weight member; and
   wherein the joining means includes a welding material welded into an filling the circumferential groove;
   wherein the joining means has an outer surface that is substantially flush with outer surfaces of the opposite end portions.

2. A steering wheel as recited in claim 1, wherein the joining means includes recessed portions, formed in the opposite end portions of the hollow ring core, for joining the opposite end portions to the weight member.

3. A steering wheel according to claim 1, wherein said weighting means is supported only by said hollow ring core.